(12) United States Patent
Yankovskiy

(10) Patent No.: US 11,449,620 B2
(45) Date of Patent: Sep. 20, 2022

(54) TRANSPARENT HIGH-PERFORMANCE DATA-AT-REST ENCRYPTION FOR PLATFORM-AS-A-SERVICE (PAAS) ENVIRONMENTS

(71) Applicant: Zettaset, Inc., Mountain View, CA (US)

(72) Inventor: Maksim Yankovskiy, Mountain View, CA (US)

(73) Assignee: ZETTASET, INC., Mountain View, CA (US)

( * ) Notice: Subject to any disclaimer, the term of this patent is extended or adjusted under 35 U.S.C. 154(b) by 779 days.

(21) Appl. No.: 16/366,101

(22) Filed: Mar. 27, 2019

(65) Prior Publication Data
US 2020/0311288 A1    Oct. 1, 2020

(51) Int. Cl.
*G06F 21/60* (2013.01)
*G06F 8/60* (2018.01)
(Continued)

(52) U.S. Cl.
CPC .............. *G06F 21/602* (2013.01); *G06F 8/60* (2013.01); *G06F 9/45558* (2013.01);
(Continued)

(58) Field of Classification Search
CPC ........ G06F 21/602; G06F 16/188; G06F 8/60; G06F 9/45558; H04L 9/083; H04L 9/0894
(Continued)

(56) References Cited

U.S. PATENT DOCUMENTS

| 8,842,841 B2 | 9/2014 | Hook et al. |
| 9,697,378 B2 | 7/2017 | Keohane et al. |

(Continued)

FOREIGN PATENT DOCUMENTS

GB    2575670 A   *   1/2020   ............. G06F 21/85

OTHER PUBLICATIONS

Pivotal, "Pivotal Cloud Foundry Documentation Ver 2.4", Pivotal (https://docs.pivotal.io), Dec. 19, 2018, CA, USA.
(Continued)

*Primary Examiner* — Kambiz Zand
*Assistant Examiner* — Phuc Pham
(74) *Attorney, Agent, or Firm* — Asif Ghias

(57) ABSTRACT

Apparatus and methods are disclosed for transparently and efficiently encrypting data-at-rest in a platform as a service (PaaS) environment. Disclosed techniques transparently transform any existing persistent data services in the PaaS environment into respective secure data services. For the deployment of the above secure data services, an encryption addon containing an addon core and activity-based callouts is provided. The addon core contains a kernel module for encryption/decryption. A coordinator in charge of the deployment executes a pre-filesystem-creation callout that encrypts a raw storage device before creating a filesystem on it. It then deploys a secure data service configured to use the filesystem. Thus, applications using the data service can now transparently store data as encrypted data-at-rest in the filesystem. Similarly, the coordinator also executes a pre-filesystem-mounting callout before mounting the filesystem for accessing encrypted-data-rest. Thus, applications using the secure data service can transparently decrypt and use the encrypted data-at-rest.

7 Claims, 4 Drawing Sheets

(51) Int. Cl.
*H04L 9/08* (2006.01)
*G06F 9/455* (2018.01)
*G06F 16/188* (2019.01)

(52) U.S. Cl.
CPC ............ *G06F 16/188* (2019.01); *H04L 9/083* (2013.01); *H04L 9/0894* (2013.01); *G06F 2009/4557* (2013.01); *H04L 2209/12* (2013.01)

(58) Field of Classification Search
USPC ........................................................ 713/165
See application file for complete search history.

(56) References Cited

U.S. PATENT DOCUMENTS

| | | | | |
|---|---|---|---|---|
| 9,804,855 | B1* | 10/2017 | Paningipalli | G06F 8/64 |
| 2013/0007889 | A1* | 1/2013 | McCloy | G06F 8/71 |
| | | | | 726/26 |
| 2013/0332194 | A1 | 12/2013 | Auria et al. | |
| 2016/0098263 | A1* | 4/2016 | Spivak | G06F 8/65 |
| | | | | 717/170 |
| 2017/0006064 | A1 | 1/2017 | Agarwal et al. | |
| 2019/0068622 | A1 | 2/2019 | Lin et al. | |
| 2019/0207828 | A1* | 7/2019 | Bon | H04L 41/5096 |

OTHER PUBLICATIONS

Vormetric, "Using Vormetric Transparent Encryption for PCF (Beta)", Vormetric/Thales Security, Mar. 1, 2019, Github (https://github.com/pivotal-cf/docs-vormetric-transparent-encryption/blob/master/docs-content/using.html.md.erb), CA, USA.

* cited by examiner

TRANSPARENT HIGH-PERFORMANCE DATA-AT-REST ENCRYPTION FOR PLATFORM-AS-A-SERVICE (PAAS) ENVIRONMENTS

FIELD OF THE INVENTION

This invention relates generally to the field of cybersecurity and specifically to securing data-at-rest in a platform-as-a-service (PaaS) environment.

BACKGROUND ART

While many concepts associated with what we know today as cloud computing had existed prior, it gained widespread acceptance with the launch of Amazon web services (AWS) in 2006. Since then, many techniques have been developed for optimizing the use of hardware and software resources, whether in a public cloud, a private data center or over a hybrid infrastructure.

Historically, in order to develop an application on a traditional infrastructure, hardware platform such as hardware servers/boxes had to be provisioned first. On top of this hardware, operating systems were then installed and configured. Then, various services such as databases and web servers had to be deployed on the operating systems. Only then, application developers could focus on developing their applications. These development efforts were frequently interrupted by the need to scale the hardware or services and/or to reconfigure failed or malfunctioning hardware, operating systems, services, etc.

Cloud computing and virtualization technologies abstracted away the need to manage hardware. This gave rise to the infrastructure-as-a-service (IaaS) layer of the cloud computing model. Typically, it is the network and infrastructure architects and engineers that interacted with the system at this layer. Still, the need to manage operating systems and services was time consuming, as applications needed to be more available, scalable and responsive.

Thus, the next iteration of resource optimization in the cloud computing model abstracted away operating systems and services, including configuration management, availability and scalability. This abstraction gave rise to the platform-as-a-service (PaaS) layer or PaaS environment or simply PaaS. This is the layer/environment used by the application developers to develop the end-user or software-as-a-service (SaaS) applications at the SaaS layer. It is these SaaS or end-user applications operating at the SaaS layer that the end-users use to interact with the system.

FIG. 1 shows a typical cloud computing pyramid/model 10 of the prior art containing IaaS 12 as the lowest abstraction layer, PaaS layer 14 of the above discussion as the intermediate layer, and SaaS layer 16 at the highest level of abstraction. Also shown are respective bubbles of typical users that interact with the system at these three layers of abstraction. As noted above, network/infrastructure architects/engineers interact with the system at IaaS layer 12, application developers at PaaS layer 14 and end-users via SaaS layer 16.

The teachings of the present disclosure will be primarily concerned with PaaS 14 of cloud computing model 10. One example of a PaaS is Cloud Foundry (CF) project by Cloud Foundry Foundation described at https://www.cloudfoundry.org/. One of its larger and well-known commercial implementations is Pivotal Cloud Foundry (PCF). Therefore, PCF or another implementation of CF may be referred to as a PaaS provider based on cloud computing model 10.

In an implementation of PaaS layer 14 based on the Cloud Foundry model/architecture, a core sub-layer within the PaaS layer is referred to as the foundation. The foundation provides basic capabilities, such as deployment, release and lifecycle management, and scalability of various components required for providing PaaS.

On top of the foundation, resides application services sub-layer within PaaS layer 14. This sub-layer provides service management, availability and scalability and is responsible for the deployment and management of service instances of services used by the applications operating at SaaS layer 16. Examples of such services include database services, such as MySQL and Redis, web servers/services, such as Tomcat, etc.

Services are deployed in PaaS 14 and specifically at its application services sub-layer in an unattended fashion and managed by the CF framework. The deployment requires no user interaction or input, and is performed in a highly parallelized fashion. Service instances are highly available and scalable. When a service instance crashes or otherwise terminates, the framework provisions a replacement instance, with the end-user application completely unaware of the event. Similarly, if a service instance becomes overloaded, the framework takes care of deploying additional service instance(s), such as database or web server instance(s), without any intervention from the application, developers, or administrators.

This rapid nature of deployment and scalability presents unique challenges and complexities with respect to data security and encryption. While there is some prior art that mentions providing encryption and data security in a cloud computing model, it is mostly concerned with encrypting data-in-transit or encrypting data at the infrastructure level. One prior art solution requires customizations and modifications to existing services at the PaaS layer, thus making it disruptive and undesirable.

US Patent Publication No. 2019/0068622 A1 to Lin et al. describes a security system for a customer computer site that includes a cloud-based manager (CBM) and on-site components. The on-site components include a manager appliance and guest agents of the CBM installed within respective virtual machines. They also include host agents of the CBM installed on hypervisors on the virtual machines. The guest agents have a many-to-one relationship with the host agents, which have a many-to-one relationship with the appliance. In one scenario, many guest agents may generate alarms and send them to the host agents. Each host agent consolidates alarms across the different virtual machines it hosts and pushes the consolidated alarms to the manager appliance. The appliance batch processes the consolidated alarms across host agents and pushes the batched alarms to the CBM, which then deduplicates the alarms and notifies an administrator. The security rules of the system call for transport layer security (TLS) encryption of data in-transit as well as encryption of durable data-at-rest.

A prior art solution from Vormetric attempts to address encryption of data-at-rest at the PaaS layer. However, the solution is deficient due to its following design limitations:

It only supports one type of data service, MySQL. In order to accomplish even this, modifications to the existing MySQL data service have to be made. Consequently, the solution is unable to support any other data services, as it requires service vendors to make modifications to the source code of their services in order to support encryption.

The solution is based on file-level encryption, and therefore introduces significant performance overhead.

The solution is based on customized service-specific "wait scripts" that need to be inserted into the service lifecycle to make the service wait for the encryption to be deployed.

In view of both patent and non-patent literature teachings, the prior art is completely deficient in providing a data-at-rest solution for a PaaS environment that is transparent or in other words requires no modification to existing data services and their lifecycles. The prior art is also silent about PaaS data-at-rest encryption solutions that require no modification to the application or client code using the data services as well as the associated development environment. The prior art is also lacking in such solutions that are high-performance and have low overheads. Furthermore, no data-at-rest encryption solution for platform as a service (PaaS) can be found in the prior art that can transparently benefit from high-availability, high-scalability and other useful features/capabilities of existing PaaS frameworks.

OBJECTS OF THE INVENTION

In view of the shortcomings of the prior art, it is an object of the invention to provide techniques for a transparent, high-performance, data-at-rest encryption solution at the PaaS layer of a cloud computing model/framework.

It is also an object of the invention to provide techniques for such a solution that transparently transforms existing data services into corresponding secure data services.

It is also an object of the invention for such a solution to be efficient and high-performance.

It is further an object of the invention for such a solution to require no modification to the client or application code using the above-mentioned secure data services.

It is also an object of the invention to benefit existing PaaS implementations from the transparent, high-performance data-at-rest encryption capabilities of the above solution.

Still other objects and advantages of the invention will become apparent upon reading the summary and the detailed description in conjunction with the drawing figures.

SUMMARY OF THE INVENTION

A number of objects and advantages of the invention are achieved by apparatus and methods designed for transparently and efficiently securing data-at-rest by encryption in a platform as a service (PaaS) environment. The PaaS environment is layered above an infrastructure as a service (IaaS) layer and below a software as a service (SaaS) layer of a typical cloud computing model. The above-mentioned transparent and high-performance encryption at the PaaS layer transparently transforms existing data services of the PaaS environment into corresponding secure or encrypted data services.

In order to accomplish the above, a coordinator module is employed that orchestrates the deployment of the above secure data services. To deploy an instance of a secure/encrypted data service, the coordinator module deploys a virtual machine (VM) dedicated to that service instance in the PaaS environment. It then deploys a stemcell operating system image in the VM. The coordinator module preferably comprises a coordinator master and a coordinator agent that is deployed with the stemcell. The coordinator master executes a script of commands that are sent to the coordinator agent to execute within the VM. Collectively, the coordinator master and agent are referred to as just the coordinator or coordinator module for convenience.

The coordinator then deploys one or more addon components, or simply addons in the VM. Addons refer to commonly used software/scripts that may be needed by multiple VMs of the PaaS environment. One such addon is the encryption addon of the present design. Encryption addon contains a set or bundle or package of software known as the core addon software or more simply just the addon core. It also contains code for various activity-based callouts or hooks that are required to be executed in the VM by the coordinator in response to certain activities or events.

The addon core contains a setup code for setting up and also preferably a teardown code for tearing down of the instant secure data service. The setup code is executed once when the addon is first deployed by the coordinator. Once executed, the setup code creates appropriate encryption headers in a raw persistent storage device on which an encrypted filesystem will be created. The encryption headers are meant to indicate that it will be an encrypted device. The raw device is a disk device or a partition for data storage before any filesystem is created on it. While in some instances the disk/device may be encrypted by the IaaS provider, it is typically unsecure or unencrypted.

The setup code also deploys an encrypt-decrypt kernel module of the present design over/above the device driver of the encrypted raw persistent storage device on which the encrypted filesystem will be created. This kernel module traps any read and write operations to the raw device and respectively and transparently performs decryption and encryption of the data-at-rest stored on the device on an ongoing basis.

The activity-based callouts/hooks of the encryption addon include a pre-filesystem-creation callout and a pre-filesystem-mounting callout. The former callout is executed in response to, and in particular, before the activity/event of the creation of the filesystem by the coordinator on the raw persistent storage device. The latter callout is executed by the coordinator before the event of mounting of the filesystem in the VM.

Before the creation of the filesystem, the pre-filesystem-creation callout is called. Once executed, this callout encrypts the raw persistent storage device to obtain an encrypted raw persistent storage device. For this purpose, it first interacts with a key manager (KM) and utilizes the above encrypt-decrypt kernel module that traps read/write operations. The code for the callout may itself generate an encryption key and deliver it to the KM for storage. Alternatively, it may obtain the key from the KM which is network-accessible to the coordinator and other PaaS components. From here onwards, any data stored/persisted on the encrypted raw persistent storage device is automatically encrypted.

The coordinator then creates the filesystem on the encrypted raw persistent storage device. As such, this filesystem is an encrypted filesystem and any data stored on it is automatically and transparently encrypted. The coordinator then deploys a data service of a given/desired flavor configured to use the filesystem. As a result, any data of the PaaS environment stored by any application code via the data service is stored as encrypted data-at-rest in the above (encrypted) filesystem and specifically the above encrypted raw persistent storage device.

Before the mounting of the encrypted filesystem, the above-mentioned pre-filesystem-mounting callout is called and executed by the coordinator. The callout contains code that decrypts the encrypted filesystem and specifically the encrypted raw persistent storage device. For this purpose, and in a manner similar to the pre-filesystem-creation callout, the callout code first obtains the encryption key from the KM and utilizes the above encrypt-decrypt kernel module that traps read/write operations. From this point onwards, the encrypted data-at-rest is automatically and transparently available in decrypted form to the application code accessing the data via the above secure data service.

The application code or the SaaS application or simply the application is developed on top of the PaaS layer. The application operates at the SaaS layer of a cloud computing model/pyramid and the end-users interact with the system using the application. In one preferred embodiment, the PaaS layer is implemented based on the Cloud Foundry (CF) model by Cloud Foundry Foundation and described at https://www.cloudfoundry.org/. Furthermore, the coordinator is a component of the PaaS environment of a typical PaaS implementation, and is innovatively utilized by the present design for deploying the instant secure data-at-rest encryption capabilities. In the case of the Cloud Foundry implementation, the coordinator is available as the Director and Agent of the BOSH project.

In the same or a related embodiment, symmetric encryption is used for the above-described encryption/decryption operations. However, the instant principles are agnostic of the various possible encryption techniques that may be employed for their practice, with or without a KM.

Additional variations of the design use activity-based callouts other than just the above-mentioned pre-filesystem-creation and pre-filesystem-mounting callouts. Exemplary additional callouts include a post-filesystem-creation callout and a post-filesystem-mounting callout. These are executed by the coordinator in response to, and in particular, after the respective events of the creation and mounting of the filesystem. These callouts may just do nothing or be a no operation (NOP), or they may perform specific functions including logging of the events and/or related metrics.

Still additional callouts include a pre-filesystem-destroying callout and a pre-filesystem-unmounting callout. When executed, a pre-filesystem-destroying callout will make the encrypted data-at-rest inaccessible. A pre-filesystem-unmount callout gets called before the unmounting of the encrypted filesystem. This may be done as a part of a graceful shutdown of the VM which may be initiated by the administrator or the coordinator as specified in its execution script.

The secure data services of the instant design may provide a number of underlying data management capabilities to the application software. These include relational databases, noSQL or key-value stores/databases, object databases or simply flat files/directories stored in the above-described encrypted filesystem. The filesystem created on the raw persistent storage device is preferably an ext4 filesystem, although it may be a JFS, a ReiserFS or a Btrfs filesystem. In general, it may be any other suitable filesystem of Linux/Unix or other computer systems.

Clearly, the system and methods of the invention find many advantageous embodiments. The details of the invention, including its preferred embodiments, are presented in the below detailed description with reference to the appended drawing figures.

BRIEF DESCRIPTION OF THE DRAWING FIGURES

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
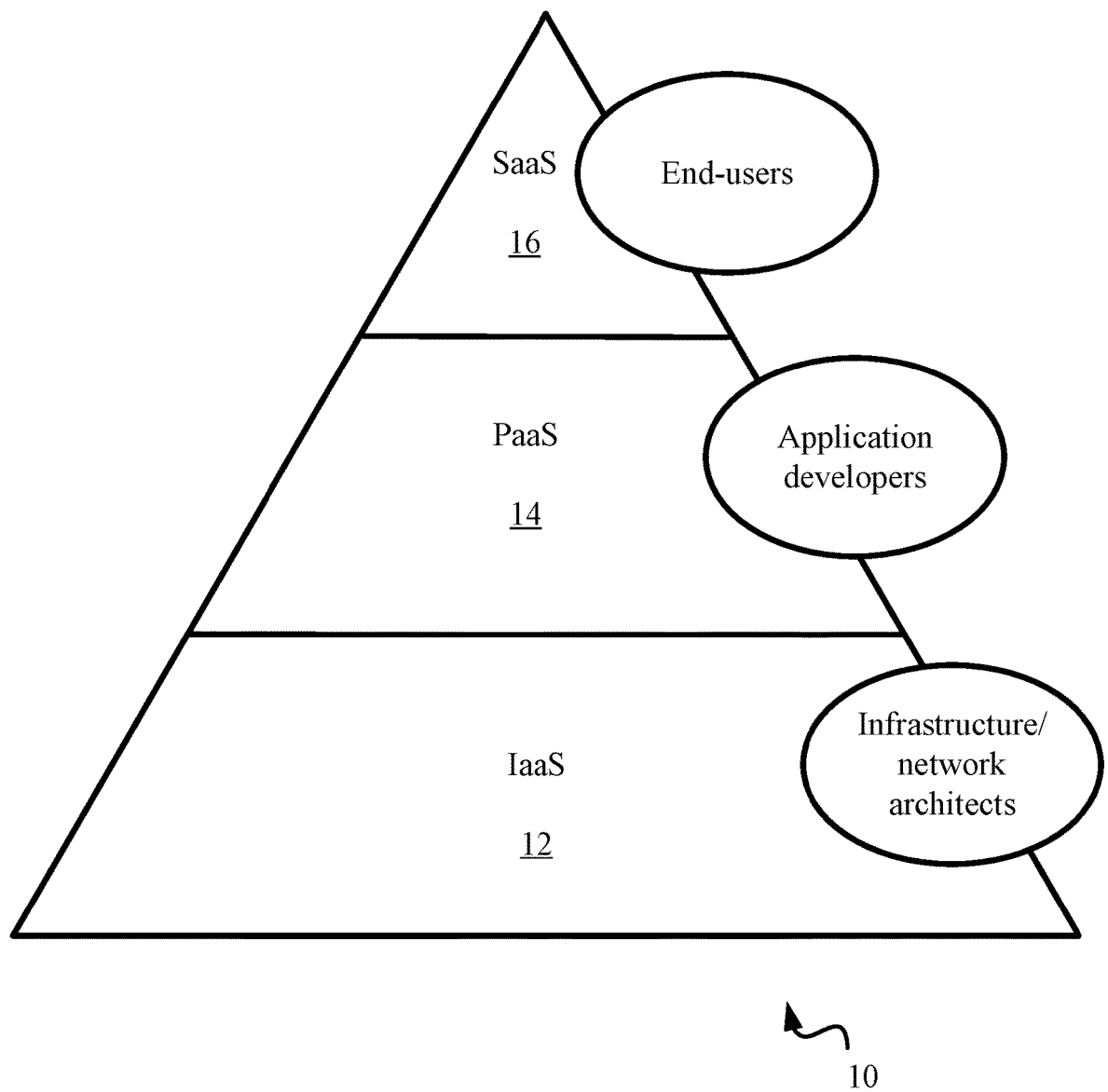
FIG. 1 shows the typical pyramid of a cloud computing model of the prior art containing an infrastructure as a service (IaaS) layer, a platform as a service (PaaS) layer and a software as a service (SaaS) layer.
Figure 2:
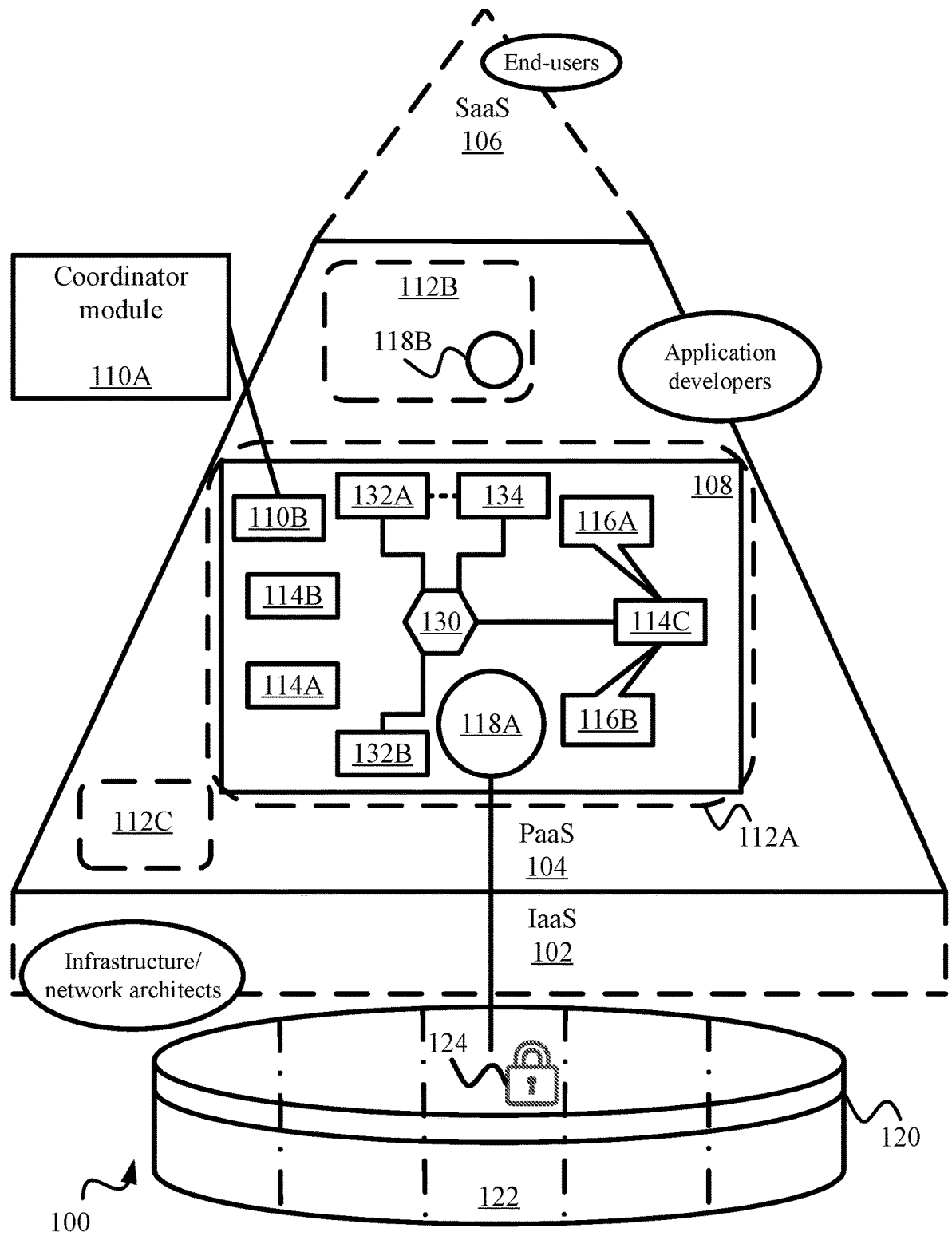
FIG. 2 illustrates the various elements of the present design in the PaaS layer of the cloud computing model, for providing transparent and high-performance encryption of data-at-rest via secure/encrypted data services.

The techniques described herein employ software or code that may be implemented purely in software, hardware, firmware or a combination of the above as required for a given implementation. The present invention will be best understood by first reviewing systems and methods for securing data-at-rest for providing a platform-as-a-service (PaaS) in a cloud computing system or framework or model 100 as illustrated in FIG. 2. Cloud computing system 100 of FIG. 2 shows an infrastructure-as-a-service (IaaS) layer or simply IaaS 102, a PaaS layer or PaaS environment or simply PaaS 104 and a software-as-a-service (SaaS) layer or SaaS application or simply SaaS 106 of a pyramid cloud computing model introduced earlier in the background section.

Although the present principles apply to any suitable implementations of PaaS 104 in cloud computing system/framework 100, the preferred embodiment is implemented using the design and architecture of the well-known PaaS by Cloud Foundry Foundation. The familiar reader will be aware of and may refer to their website https://www.cloudfoundry.org/ for details. Furthermore, the present specification and its principles also apply to any particular cloud model chosen, whether it be a public cloud, a private cloud or any form of a hybrid cloud.

FIG. 2 shows IaaS 102 and SaaS 106 only via dashed lines while emphasizing PaaS layer 104 by delineating it in an expanded form in order to facilitate explanation of the present design. As will be discussed, the instant technology provides a secure data service to application developers developing SaaS applications on PaaS 102 that transparently stores data-at-rest in an encrypted form. End-users ultimately interface with the cloud system via SaaS 106.

The data-at-rest as referred to herein may comprises any data of interest that can benefit from being protected with encryption for storage in cloud computing system 100.

Examples include customer data, company data, public records, sensitive or personally identifiable information (PII) data, financial records, healthcare data, etc., and/or system data such as logging data or performance data and/or metadata about any data of interest.

Regardless of the nature of the data that is secured and encrypted, it is accessed by application level code or client code via secure data services to be discussed further below. Exemplary end-user applications by which end-users access cloud computing system 100 include a customer relationship management application, a social media application, a search engine, a scientific application, a financial application, a healthcare application, etc.

The benefits of the present design are preferably accrued by having a coordinator or director module 110 that orchestrates the deployment of various PaaS components/modules of cloud system 100 as well as their monitoring afterwards. Such a coordinator/director module in charge of the deployment and monitoring the various PaaS components in cloud system 100 preferably consists of two sub-modules, a coordinator master 110A and a coordinator agent 110B as shown in FIG. 2.

Alternative embodiments may employ a coordinator module without any sub-modules that remotely executes commands in a VM as discussed below. In the Cloud Foundry implementation of PaaS, such a coordinator module is referred to as the Director. The instant design provides innovative improvements over the coordinator/director of the prior art for deploying its secure or encrypted data-at-rest encryption services as described herein.

According to the chief aspects, and referring to FIG. 2, a virtual machine (VM) 112A is first deployed by coordinator master 110A at PaaS layer 104. VM 112A is instantiated and managed by the coordinator on a suitable hardware offered by IaaS 102. The provisioning of the hardware at IaaS 102 onto which VM 112A is deployed by coordinator 110 is done according to techniques known in the art.

Typically, coordinator master 110A would make the appropriate application programming interface (API) calls to underlying IaaS 104 for requesting enough compute, storage, networking and other resources that it deems fit for instantiating VM 112A. Such provisioning capabilities of IaaS 102 and their usage from specific IaaS vendors are well known in the art and will not be discussed in detail in this specification. Exemplary IaaS solutions include Amazon AWS, Microsoft Azure, Rackspace Open Cloud, Google Cloud Platform, HP Enterprise Converged Infrastructure, IBM SmartCloud Enterprise, Green Cloud Technologies, etc.

The next step performed by coordinator module 110A is the deployment of an operating system (OS) 108 in VM 112A. In the context of a Cloud Foundry implementation of PaaS, OS instance 108 is a stemcell OS instance or simply a stemcell 108. As will be understood by those skilled in the art, a stemcell is a versioned OS image wrapped with IaaS specific packaging. Once deployed in VM 112A, stemcell 108 renders it a bare minimum OS skeleton with common pre-installed utilities including coordinator agent 110B as well as configuration files to securely configure the OS by default.

From this point forward, coordinator master 110A issues commands to coordinator agent 110B executing in VM 112A. These commands are preferably contained in a script that may also utilize an associated YAML ain't markup language (YAML) file containing any associated configuration information. The script is run from a command line interface (CLI) of coordinator master 110A which is network-accessible to the PaaS layer of model 100. These commands are then executed by coordinator agent 110B in VM 112A typically in an unattended manner.

Together, coordinator master and agent 110A and 110B respectively are thus responsible for orchestrating the deployment of and subsequent monitoring and availability of VM 112A along with its various components. These include addons as well as data service 118A to be discussed in detail further below. For simplicity, we may at times refer to coordinator master and agent 110A and 110B respectively working thusly in conjunction by the collective term of coordinator 110.

Furthermore, from this point onwards, unless needed, we will drop any explicit reference to stemcell 108 with the understanding that it is now deployed in VM 112A to render it its minimum functional capabilities per above discussion. Two other VMs 112B and 112C are also shown in PaaS layer 104 of FIG. 2 although any number of such VMs are admitted to be deployed by coordinator 110 for providing PaaS 104 in cloud computing system 100. Another data service 118B based on the instant principles is provided in VM 112B. VM 112C does not contain any data service, or it may simply contain an unsecure/un-encrypted data service based on the techniques of the prior art. As such, VM 112C will not be the focus of our discussion below.

At this point, coordinator/director master 110A in conjunction with coordinator agent 110B deploys one or more addons 114A, 114B, 114C, . . . in VM 112A. Any number of such addons are possible. An addon is a software package that conforms to the deployment interface understood by coordinator 110 and is colocated or executed in multiple VMs instantiated and managed by coordinator 110. Unsurprisingly, the addons constitute commonly used software that may be needed on all VMs. Examples include security software such as Tripwire or IPsec for authentication and encryption of data-in-transit. Further examples include anti-virus software such as McAfee, custom health monitoring agents like Datadog, logging agents like Loggregator's Metron, etc.

Coordinator 110 is also responsible for provisioning various services to be available to application or client code developed by application developers at PaaS layer 104. Coordinator master/agent 110A/B instantiate an instance of each such services on each of VMs 112A, 112B, 112C, . . . for providing PaaS 104. Therefore, there may be a variety of such services available to the application developers in a given PaaS environment such as PaaS 104 of FIG. 2.

In the Cloud Foundry implementation, these services are provided at the application services sub-layer of PaaS introduced earlier in the background section. They are available in a marketplace of services from where developers can pick and choose the services they need. These services are then licensed or purchased by the developers for use in their code as per the applicable licensing terms of the services determined by the service providers and the PaaS provider.

A type of such services are data management services or simply data services 118A, 118B, and so on that may be used by application code to access data in persistent storage 120. These data services are available in a variety of flavors, 118A, 118B, . . . in the above-mentioned marketplace in order to provide various data management technologies to the application or client code. Exemplary data management technologies include relational databases, key-value stores, object databases, flat files, etc. Therefore, data service 118A deployed in VM 112A may be a relational database service, such as a MySQL data service. Similarly, data service 118B deployed in VM 112B may be a key-value store data service, such as a Redis data service, and so on.

Based on the instant principles and as explained further below, existing data services 118A, 118B, . . . are transparently transformed into respective secure or encrypted data services 118A, 118B, . . . instantiated/executed in their respective VMs. Although, we may refer to data services 118A, 118B, . . . (or simply data services 118), as secure data services 118, it must be noted that a key benefit of the present design is that it does not require any modifications to existing services 118. To paraphrase, data accessed by application code via data services 118 is transparently and efficiently encrypted for storage as encrypted data-at-rest and conversely transparently decrypted before its retrieval and usage by the application.

To facilitate explanation, we will focus on VM 112A with its secure data service 118A which may be any of the above flavors. We will have the understanding that the teachings are similarly applicable to the deployment of other secure data services based on the instant principles, such as data service 118B in VM 112B, or any other secure data services.

To deploy secure data service 118A in VM 112A, a specialized addon referred to herein as encryption addon 114C of the present design is provided. Encryption addon 114C is responsible for implementing the encryption capabilities of data service 118A. For this purpose, instant encryption addon 114C comes with various components and sub-components as provided below along with their reference numerals in FIG. 2:

1. Core addon software or addon core 130
    a. Setup code 132A—executed once when encryption addon 114C is first deployed
        i. Mark/populate headers of raw persistent storage device 120 to indicate that it will be encrypted
        ii. Deploy encrypt-decrypt kernel module 134 that traps read/write operations for ongoing decryption/encryption respectively
    b. Teardown code 132B—executed once when data service 118 is permanently dismantled
2. Activity-based callouts/hooks
    a. Pre-filesystem-creation callout 116A—called/executed before the creation of filesystem 122
    b. Pre-filesystem-mounting callout 116B—called/executed before filesystem 122 is mounted in VM 112A
    c. Post-filesystem-creation callout (not explicitly shown in FIG. 2)—called/executed after the creation of filesystem 122
    d. Post-filesystem-mounting callout 116B (not explicitly shown in FIG. 2)—called/executed after filesystem 122 is mounted in VM 112A
    e. Pre-filesystem-unmounting callout (not explicitly shown in FIG. 2)—called/executed before filesystem 122 is unmounted from VM 112A during a graceful shutdown
    f. Pre-filesystem-destroying callout (not explicitly shown in FIG. 2)—called/executed during a teardown or dismantling of secure data service 118A To explain in further detail, encryption addon 114C contains a bundle or collection or set or package of core addon software or addon core software or simply addon core 130 shown in FIG. 2. Addon core 130 enables the core or fundamental capabilities of the addon such as encryption/decryption. More specifically, addon core 130 contains a setup code 132A, a teardown code 132B and the code for an encrypt-decrypt kernel module 134.

After encryption addon 114C is first deployed by coordinator 110, addon 114C first executes the setup routine/steps embodied by its setup code 132A. When thus executed, setup code 132A marks or populates appropriate headers of raw persistent storage disk/device 120 shown in FIG. 2 to indicate that it will be encrypted. As shown by the dotted line between setup code 132A and kernel module 134, setup code 132A also deploys the kernel module of the instant design referred to herein as encrypt-decrypt kernel module 134. This module is deployed over or above or on top of the device driver of disk/device 120 and it traps all read/write operations performed on the device. During the service routines of these read/write traps, it thus transparently and respectively decrypts/encrypts all data read or written from/to the device on an ongoing basis.

Encryption addon 114C of FIG. 2 further contains code for one or more activity-based callouts or "hooks". These callouts or hooks are software code/scripts that are called or executed by coordinator 110. They are referred to as activity-based hooks because they are associated with an activity or an event occurring in VM 112A during the deploying or routine operation of secure data service 118A.

Two such activity-based callouts 116A and 116B are of special interest. They are used by encryption addon 114C to accomplish its objectives of transparent encryption/decryption of data-at-rest in cloud system 100. One of such activity-based callout 116A is executed in VM 112A by coordinator agent 110B immediately before the event/activity of the creation of filesystem 122 into which data is stored via secure data service 118A. As such, callout 116A is conveniently referred to as a pre-filesystem-creation callout/hook. Similarly, activity-based callout 116B is executed in VM 112A by coordinator agent 110B immediately before mounting filesystem 122. As such, callout 116B is conveniently referred to as a pre-filesystem-mounting callout or hook.

Thus, pre-filesystem-creation callout/hook 116A is executed before filesystem 122 is created on disk 120 by coordinator agent 110B in VM 112A. Callout 116A is a script or software code that encrypts entire storage device or disk 120 or one of its partitions (shown by dot-and-dashed vertical lines) and onto which filesystem 122 is to be created. For this encryption, callout 116A calls upon encrypt-decrypt kernel module 134 discussed above. Further, callout 116A preferably performs a key-exchange operation with a key manager (KM) as further explained below. Device/disk 120 provides persistent storage and is accessible to coordinator 110, specifically its agent 110B, for the creation of filesystem 122.

Device/disk 120 is a raw device without any filesystem and it is encrypted by callout 116A in its underlying raw form prior to the creation of filesystem 122 on it. In the preferred embodiment, filesystem 122 created on encrypted and raw persistent disk/device 120 is an ext4 filesystem, although it may be a journaling file system (JFS), a ReiserFS filesystem or a Btrfs filesystem. In general, it may be any other filesystem, such as any suitable Linux/Unix filesystem that can be created via callout 116A on raw device 120. The result of the execution of pre-filesystem-creation callout 116A is an encrypted raw persistent storage device 120.

Explained even further, callout/hook 116A encrypts an otherwise raw/ordinary and unsecure/unencrypted persistent storage device 120 (or one of its partitions) accessible to VM 112A, into an encrypted storage device or more specifically an encrypted raw persistent storage device as shown by lock 124. It is this encrypted raw persistent storage device onto which filesystem 122 on disk/device 120 is created and it is encrypted filesystem 122 onto which data service 118A is deployed/instantiated by coordinator 110.

Recall from above that by now encrypt-decrypt kernel module 134 that traps read/write calls and respectively decrypts/encrypts data on device 120 has already been deployed. So, from this point forward, all data stored by any application/code in filesystem 122 via data service 118A is encrypted data-at-rest and in a completely transparent manner to the application and on an ongoing or continual basis. This is because any store/write operation issued from secure data service 118A will be trapped by kernel module 134 that will encrypt the data being written/stored.

Pre-filesystem-creation callout 116A is executed once during the lifetime of VM 112A on which the dedicated instance of secure data service 118A is running. This is before the creation of filesystem 122 per above. The callout encrypts raw storage device 120 onto which filesystem 122 is created per above. This encryption is performed only initially on the device. However, it is kernel module 134 that is responsible for encrypting any data write requests on a continual/ongoing basis. As explained, the module performs this encryption by trapping and servicing write calls issued from data service 118A for filesystem 122 on encrypted raw persistent storage device 120.

Kernel module 134 and callout 116A perform encryption or ciphering using techniques known in the art. The instant design is agnostic of the many different types of encryption regimes available in the art. In the preferred embodiment, both encrypt-decrypt kernel module 134 and pre-filesystem-creation callout/hook 116A employ symmetric encryption. For this purpose, they preferably interact with a key manager (KM) to perform key exchange operations as needed. In other words, kernel module 134 would request an encryption key from the KM (not explicitly shown in FIG. 2) before commencing encryption. Similarly, callout 116A would request the encryption key from the KM before encrypting the raw persistent storage device. Alternatively, it may generate an encryption key and then send it to the KM for storage. In these embodiments using the KM, the KM is preferably responsible for the management and lifecycle of all encryption keys for providing PaaS 104.

In another preferred variation, the KM implements the well-known key management interoperability protocol (KMIP) and/or public-key cryptography standards (PKCS) #11. In the same or a related embodiment, the KM may also be backed by a hardware security module (HSM), which may be a hardened hardware-based device or software-based (soft-HSM).

Let us now look at how encrypted data-at-rest stored in encrypted/secured filesystem 122 of the present design is decrypted and accessed via secure data service 118. For this purpose, a pre-filesystem-mounting callout/hook 116B is executed by coordinator module 110 before the activity/event of mounting of secure filesystem 122 in VM 112A. Callout 116B is a script or software that decrypts the data stored in filesystem 122 by preferably first obtaining the encryption key from the KM. Once filesystem 122 has been decrypted using the encryption key, the filesystem is mounted for the mount event by coordinator agent 110B, and the decrypted data is available to the VM.

In this fashion, all data-at-rest accessible via data service 118A to application code is first automatically decrypted in a manner that is completely transparent to the application code. Furthermore, in a manner analogous to storing/writing of data explained above, any data read by any application/code in filesystem 122 on an ongoing basis via data service 118A is decrypted in a completely transparent manner to the application. This is because the read operation issued from secure data service 118A will be trapped by kernel module 134 that will decrypt the data being read or accessed.

Pre-filesystem-mounting callout 116B is typically executed once or infrequently during the lifetime of VM 112A on which the dedicated instance of secure data service 118A is running. This is before the mounting of filesystem 122 per above. The callout decrypts data-at-rest stored in an encrypted form on encrypted raw persistent storage device 120 onto which filesystem 122 is created per above. It does so by calling upon encrypt-decrypt kernel module 134.

While the above initial decryption by callout 116B is performed initially for mounting filesystem 122, it is kernel module 134 that is responsible for decrypting any data read requests on a continual or ongoing basis. As explained, the module performs this decryption by trapping and servicing read calls issued from data service 118A for filesystem 122 on encrypted raw persistent storage device 120. For the above decryption, both callout 116B and encrypt-decrypt kernel module 134 preferably interact with a KM to perform key exchange operations as needed.

A key benefit of the present technology is that any application level code developed at PaaS layer 104 of FIG. 2 does not need to be modified or has to do anything special in order to have data-at-rest encryption of data in filesystem 122. Similarly, data service 118A does not need to be modified in order to have the benefit of a filesystem that maintains all its data-at-rest in an encrypted and secured form.

The present design of encryption addon 114C with its above-described core addon software 130 and activity-based callouts/hooks 116A/B allows cloud computing system 100 to retain data services 118A, 118B, . . . as-is and without modification while transparently encrypting/decrypting underlying data in respective encrypted storage device(s). Similarly, and as noted, no changes are required to any application code that can continue to use data services 118 with now the benefit of transparent encryption/decryption of underlying data-at-rest.

Note, that in reality the client or end-user application will launch a service "instance" of the desired secure data service, such as secure data service 118B. This will trigger the launch of VM 112B by coordinator 110 and the VM will be dedicated to this service instance. The client code will then connect to this instance for storing/accessing the above encrypted data-at-rest. The underlying PaaS framework will launch a new instance for the application if the old instance fails/crashes or launch additional instances to meet the application load as needed. This handling of service instances by the framework in response to high-availability and high-scalability events is completely transparent to the end-user application.

Therefore, to avoid confusion, and unless otherwise needed, the distinction between the data service and its instances is deliberately avoided in the present teachings. This is done with the understanding that the requisite instances for our secure data services 118 will be launched and made available by the PaaS framework as required for PaaS 104 of FIG. 2 in order to meet the needs of end-user SaaS applications operating at SaaS layer 106.

Referring still to FIG. 2, teardown code 132B of addon 114C is executed when secure data service 118A is to be permanently dismantled. Such an event occurs once and on an exceptional basis. As such, some embodiments may not include teardown code 132B in addon 114C. In embodiments that do, teardown code 132B may be used to perform the requisite dismantling functions. Such exemplary functions include revoking the authentication certificate issued by a certificate authority (CA) to secure data service 118A, etc.

Focusing again on VM 112A with secure data service 118A, the present design merely requires the deployment of its encryption addon 114C with its addon core and activity-based callouts/hooks and requires coordinator 110 to execute those hooks based on their respective activities in VM 112A. To understand the present design further, let us now take advantage of flow diagram 150 of FIG. 3 delineating the sequence of steps carried out by coordinator 110 in VM 112A to deploy secure data service 118A for providing PaaS 104 of FIG. 2.

These steps are preferably carried out by coordinator 110 by executing a script written in an appropriately high-level language/script such as Ruby, Go, Python, etc. or a variation thereof. The script may also utilize an associated configuration file specified in YAML and is run on a CLI of coordinator master 110A. When the script is run, the CLI sends respective commands to coordinator agent 110B that is executed in VM 112A. Of course, for this to be possible the CLI needs to be authenticated and be on the same network or be network-accessible as other components, including VM 112A of cloud computing system 100. This authentication is performed using techniques known in the art and not delved into detail in this specification.

The first step is the deployment of a VM such as VM 112A of FIG. 2 with a stemcell 108 with minimum functional capabilities per above discussion. This is shown by process block or box 152 in FIG. 3. Next step is the deployment of addons, such as addons 114A, 114B, 114C, . . . of FIG. 2 and related discussion. The deployment of addons takes the form of "pushing" the required binary executables and libraries in the form a binary large object (blob) as well as any other supporting files into the appropriate target directories of VM 112A as specified in preferably a YAML file or "manifest". Per above, the blob of our encryption addon 114C contains script/code of its addon core or core addon software 130, and code for pre-filesystem-creation and pre-filesystem-mounting callouts/hooks 116A and 116B of the above teachings. The manifest specifies into which target directories of the VM its various binaries and library files will be copied/deployed by coordinator 110.

Figure 3:
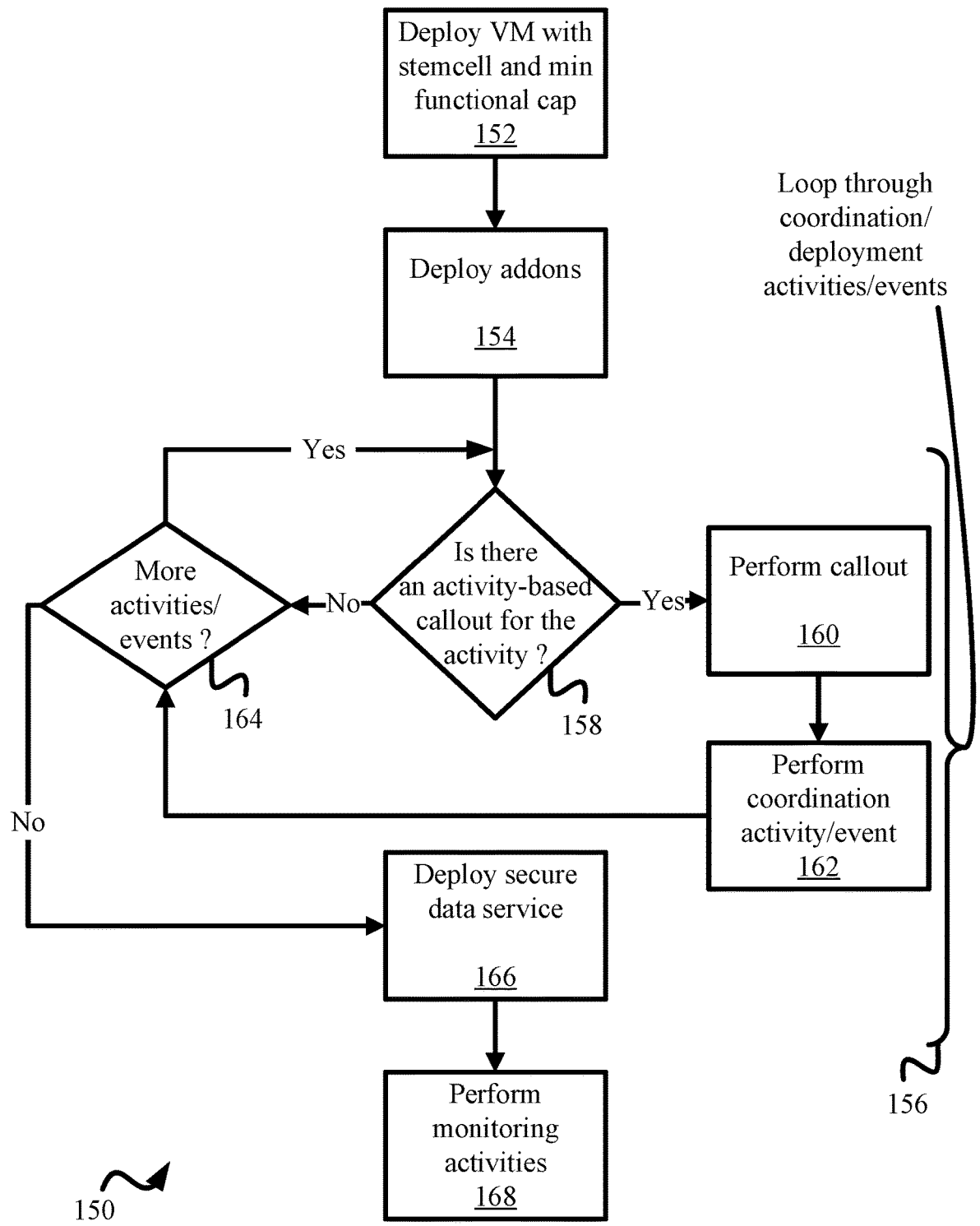
FIG. 3 shows in a flowchart or flow diagram form the various steps carried out by the coordinator module of the design to deploy and monitor one or more secure data services based on the instant principles.

At this point, coordinator loops through a list of deployment or coordination activities or events that it needs to perform in order to perform the deployment and monitoring of data service 118A in VM 112A as well as deploying/monitoring of any other addons or activities in the VM. This list/collection of deployment/coordination activities/events are denoted by bracket 156 as shown in FIG. 3.

As coordinator 110 goes through the list, it first checks if the activity/event at hand has an activity-based callout or hook of the above discussion and as indicated by decision diamond 158. Activity-based callouts/hooks can be required to be executed before or "pre" activity/event. Earlier teachings discussed two such callouts, a pre-filesystem-creation callout 116A of FIG. 2 and a pre-filesystem-mounting callout 116B of FIG. 2 and related discussion. Conversely, activity-based callout/hook can be required to be executed after or "post" an activity/event. Examples of such post events will be further discussed below. Recall that activity-based callout 116A performs encryption of data-at-rest on device 120 of FIG. 2 on which filesystem 122 is then created, while callout 116B performs its decryption before it is mounted in VM 112A.

If there is such a pre and/or post activity-based callout/hook, coordinator 110 performs or executes the callout/hook before and/or after the corresponding activity/event as required and as shown by box 160. More specifically, it executes the corresponding activity/event after a pre callout or before a post callout. This is shown by box 162 of FIG. 3. It then checks to see if there are any further deployment activities/events in the list of activities/events to be performed as denoted by bracket 156. This check is indicated by decision diamond 164. If the answer is yes, coordinator 110 then returns to decision diamond 158 of above discussion.

Otherwise, it deploys secure data service 118A over filesystem 122 of FIG. 2 and related discussion and which is now encrypted/secured. Once data service 118A is deployed per step 166 of FIG. 3, any application code deployed at PaaS layer 104 may utilize this secure data service. From this point forward, any data written/read via service 118A is transparently encrypted/decrypted by encrypt-decrypt kernel module 134 of FIG. 2 on an ongoing basis.

The actual deployment of data service 118A employs configuring the service and invoking it in VM 112A using APIs specific to the PaaS implementation. This is done using techniques known in the art and is depicted by step or block/box 166. More specifically, and in a manner similar to the deployment of addons, this also includes pushing the blob for the service and associated files into respective directories of the VM and then invoking the executable for the service.

As already noted, an exemplary PaaS implementation that can benefit from the present design is the Cloud Foundry model provided at https://www.cloudfoundry.org/. The service deployment process of the PaaS implementation is not delved into detail in this discussion and as per above teachings remains unchanged by the present design. This is one of the key advantages of the present technology over the prior art.

It should be noted that after deployment of data service 118A (instance) at box/step 166, coordinator 110 may continually perform a set of monitoring activities that check the health of the data service as well as addons 114. If the service instance fails, coordinator 110 instantiates another VM in PaaS layer 104 and repeats the steps performed earlier for the provisioning of the service, namely deployment of the stemcell, addons and activity-based hooks per above teachings. The monitoring activities are indicated by box 168 in FIG. 3. Such monitoring activities are known to those skilled in the design and architecture of specific PaaS implementations and are not delved into detail in this specification.

Because instant secure data services 118 can be deployed unmodified over an existing PaaS environment, they enjoy the de facto benefits of the environment. Therefore, in a Cloud Foundry model, they have high-availability and high-scalability afforded by the foundation and the framework. In other words, if an instance of the secure data service, such as service 118B, used by an end-user application fails, a new instance of secure data service 118B is provisioned completely transparently for the end-user application. Similarly, if an instance becomes overloaded, additional instances are launched in a transparent manner to the application.

Note, that the functionality of the above design does not change even if disk/device 120 is encrypted at IaaS layer 102 of FIG. 2 by the IaaS provider. In other words, the present design of securing data-at-rest for PaaS 102 does not conflict with the encryption capabilities if provided by the IaaS provider. Explained further still, the IaaS provider may encrypt entire disk 120 or set of disks in cloud computing system 100 onto which it provides raw storage devices that are available to the VMs created by coordinator 110. In such a variation, filesystem 122 created on such encrypted disk(s) 120 re-encrypts data-at-rest residing in in these storage devices and accessed via data services 118 per above description. In this manner, such a variation provides data-at-rest encryption for PaaS that is over and above any encryption provided by the IaaS provider.

As already noted, there may be any number of partitions on disk 120 of FIG. 2 as well as storage volumes that may span multiple disks which are then accessible as raw storage device(s) in VM 112A. Per above teachings, the raw storage, in whichever form, is then encrypted via pre-filesystem-creation callout 116A and specifically encrypt-decrypt kernel module 134 of encryption addon 114C. Only then filesystem 122 is created on the encrypted raw storage device and then referred to as encrypted filesystem 122 and in which data-at-rest is stored/accessed via data services 118 per above teachings.

Furthermore, raw storage device(s) may also exist on a storage area network (SAN) or in a redundant array of independent disks (RAID) architecture. The above teachings for securing data-at-rest in encrypted form still apply. In summary, the present design is agnostic of the design of the physical/logical storage onto which filesystem 122 of the embodiment shown in FIG. 2 is created. The basic concepts of data storage architecture are well understood in the art and are not delved into detail in the present disclosure.

In a similar manner, the instant design is also agnostic of the specific type of data service 118A, 118B, . . . of FIG. 2 required to support the software technologies and database management systems for storing data for providing PaaS 104. More specifically, data services 118 may exist in many flavors for supporting specific data management technologies. No matter what the flavor, the present design with its encryption addon 114C consisting of its core addon software 130 with encrypt-decrypt kernel module 134 and activity-based callouts 116, converts the services into a respective secure data-at-rest services for PaaS 104. This is because addon 114C encrypts data at the lower device/partition level, and the design is thus agnostic of the type of logical storage software stack that is implemented above it.

Thus, in various embodiments, the types data storage systems supported by various flavors of data services 118 with our encryption addon 114C include relational databases, for example MySQL, PostgreSQL, Oracle, SQL Server, etc. Data storage systems supported by the instant design also include noSQL databases or key-value stores, such as MongoDB, Couch DB, Redis, RavenDB, etc. Of course, data services 118 with encryption addon 114C of the present design also include simply flat files in directories stored in encrypted filesystem 122 on disk/device 120 of FIG. 2.

Moreover, because the encryption is done at the device/partition level, it is highly efficient and high-performance with an extremely low overhead compared to the technologies of the prior art. As noted in the background section, some prior art techniques provide encryption in the PaaS environment at the file-level which is much more inefficient when compared to the instant design. Furthermore, the solutions of the prior art also require modifications, such as "wait scripts" in the deployment of the data service which is a huge drawback when desiring a completely transparent encryption solution such as that provided by the present teachings.

As noted, the present technology does not require any modifications to the existing data services and their life-cycles. Similarly, they do not require any changes to the client application code, or any changes to the development environment or user processes for application development, deployment, and maintenance. As a result, the practitioners are able to improve and optimize the practices of their development operations (DevOps) in the cloud computing model.

In some embodiments, encryption addon 114C also has hooks/callouts that are executed after the completion of an activity/event. For example, a counterpart callout/hook to our earlier pre-filesystem-creation callout 116A is a post-filesystem-creation callout that is executed by coordinator 110 of FIG. 2 after filesystem 122 is created on storage device/disk 120. Alternatively, or in addition, a counterpart callout/hook to our earlier pre-filesystem-mounting callout 116B is a post-filesystem-mounting callout that is executed by coordinator 110 of FIG. 2 after filesystem 122 is mounted in VM 112A.

In some variations post-filesystem-creation and post-filesystem-mounting callouts do nothing or are a "no operation" or NOP. In alternative variations, they are used to log the respective events of the creation of instant secure filesystem 122 and its mounting and/or any associated metrics. Any other activity-based callouts/hooks may be conceived and implemented corresponding to a variety of deployment and monitoring activities of the coordinator in order to serve the needs of a given implementation.

Examples of other callouts include a pre-filesystem-unmounting callout and a pre-filesystem-destroying callout. Pre-filesystem-unmounting callout is called by the coordinator during a graceful shutdown of the VM which may be initiated by the administrator or the coordinator itself as a part of its execution script. More specifically, the event of unmounting of the filesystem is executed as a part of the shutdown. This callout is called in advance of the unmount per above teachings. This callout may do nothing or it may perform a specific task as desired in some variations.

Pre-filesystem-destroying callout is called by the coordinator for permanently dismantling the secure data service during a teardown of the service. As noted above, teardown code 132B of FIG. 2 is executed by coordinator 110 to effect such a teardown activity, which is done rarely or on an exceptional basis. When called, pre-filesystem-destroying callout will delete the encryption key from the KM, thus making encrypted data-at-rest unusable.

Figure 4:
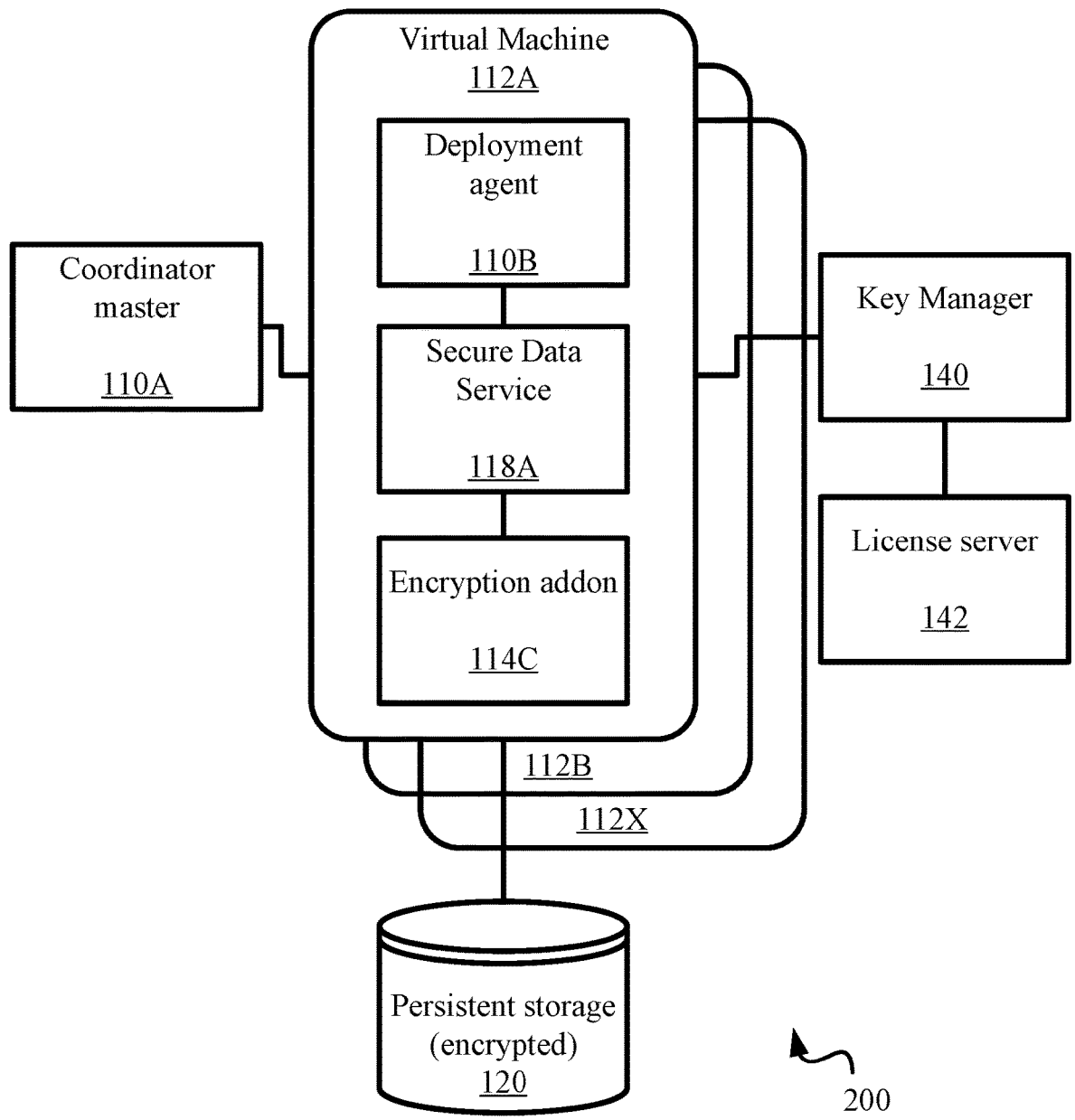
FIG. 4 illustrates an architecture block diagram of the present design showing a key manager as well as a license manager.

Let us now look at FIG. 4 that shows a block-diagram architecture 200 of the various PaaS components required to provide secure/encrypted data services 118 for providing PaaS in cloud computing model 100 of FIG. 2. FIG. 4 shows and emphasizes many of the same elements of FIG. 2 with like reference numerals. However, other elements have been left out to avoid detraction and some new elements added to benefit the below discussion.

More specifically, FIG. 4 shows a coordinator master 110A and a coordinator agents 110B included in the stemcell deployed in VM 112A per above teachings. Any number of such VMs 112A, 112B, . . . 112X, . . . may be instantiated upon the IaaS layer as shown. The IaaS layer of FIG. 2 is not shown in FIG. 4 to avoid clutter. Also shown is encryption addon 114C of the above teachings as well as persistent storage disk/device 120. Any number of such addons may be deployed in VM 112A per above teachings, although they are not explicitly shown in FIG. 4 to avoid detraction.

It is the responsibility of the coordinator module, specifically its master and agent 110A and 110B respectively to ensure that encryption addon 114C with its addon core and activity-based hooks is deployed per above discussion and per flow diagram 150 of FIG. 3. Coordinator agent 110B also maintains a mapping of the device identification number(s) or device ID(s) that are encrypted during the execution of pre-filesystem-creation callout/hook of the above teachings.

Further shown explicitly in FIG. 4 is a key manager (KM) 140 that is network-accessible to the VMs 112. Per above teachings, KM 140 is responsible for holding/storing the encryption key used for encrypting data-at-rest during the execution of pre-filesystem-creation callout and by encrypt-decrypt kernel module on an ongoing basis. The encryption key is used for decrypting the encrypted data-at-rest during execution of the pre-filesystem-mounting callout as well as by the encrypt-decrypt kernel module on an ongoing basis.

As noted earlier, there may be any number of encrypted/secure data services 118A, 118B, . . . in a given PaaS implementation depending on the type or flavor of the data management technologies deployed. As such, KM 140 may hold encryption keys for all encrypted data devices on which those data services are deployed. More specifically, it is the encrypted filesystems on those devices on which the data services are deployed per above teachings. As noted above, KM 140 may implement KMIP and/or PKCS #11 or any other key management standard.

Finally, architecture diagram of FIG. 4 also shows a license server 142 that is responsible for maintaining and interrogating license usage for the various encrypted devices. More specifically, secure data service 118A may be offered to application developers according to specific licensing terms. Similarly, secure data service 118B on VM 112B may be offered on same or other licensing terms. It is the responsibility of license server 142 that is network-accessible to KM 140 to ensure that encryption keys are made available to the data services (and more specifically encryption addon 114C with its addon core and activity-based hooks) only after ascertaining that applicable licensing terms are met by the application (client) using the service.

As already noted, although not necessarily, the present design is preferably implemented in a Cloud Foundry model as available at https://www.cloudfoundry.org/. As such, the present teachings are provided by contextualizing them in the context of a Cloud Foundry PaaS model with which skilled artisans are already familiar. The present design provides significant improvements over the prior art by providing high-performance and transparent data-at-rest encryption capabilities to various PaaS implementations, including the Cloud Foundry model as well as any of its commercial implementation.

In view of the above teaching, a person skilled in the art will recognize that the methods of present invention can be embodied in many different ways in addition to those described without departing from the principles of the invention. Therefore, the scope of the invention should be judged in view of the appended claims and their legal equivalents.

What is claimed is:

1. A computer system for providing a platform as a service (PaaS), said computer system comprising at least one memory device storing computer-readable instructions and at least one microprocessor coupled to said at least one memory device for executing said computer-readable instructions, said at least one microprocessor configured to:
(a) deploy a virtual machine (VM);
(b) deploy a stemcell operating-system in said VM;
(c) deploy an encryption addon in said VM, wherein said encryption addon comprises an addon core, a pre-filesystem-creation callout and a pre-filesystem-mounting callout;
(d) deploy over a device driver of a raw persistent storage device, an encrypt-decrypt kernel module contained in a setup code of said addon core;
(e) in advance of creating a filesystem on said raw persistent storage device accessible in said VM, execute said pre-filesystem-creation callout for encrypting said raw persistent storage device to obtain a corresponding encrypted raw persistent storage device;
(f) create said filesystem on said encrypted raw persistent storage device;
(g) deploy a secure data service configured on said filesystem for storing and accessing data as encrypted data-at-rest related to said PaaS; and
(h) wherein said encrypt-decrypt kernel module traps write operations issued from said secure data service for ongoing encryption, and traps read operations issued from said secure data service for ongoing decryption of said data-at-rest.

2. The computer system of claim 1, wherein said encrypted data-at-rest is stored in said filesystem in one of a relational database, a noSQL database, an object database and flat files.

3. The computer system of claim 1, wherein said encryption addon further comprises one or both of a post-filesystem-creation callout and a post-filesystem-mounting callout.

4. A computer-implemented method of providing an encrypted data service in a platform-as-a-service (PaaS) environment, said method comprising the steps of:
(a) deploying a virtual machine (VM) in said PaaS environment;
(b) deploying a stemcell in said VM;
(c) deploying an encryption addon in said VM, said encryption addon comprising an addon core, a pre-filesystem-creation callout and a pre-filesystem-mounting callout;
(d) deploying over a device driver of a raw persistent storage device, an encrypt-decrypt kernel module contained in a setup code of said addon core;
(e) in advance of creating a filesystem on said raw persistent storage device accessible in said VM, executing said pre-filesystem-creation callout for encrypting said raw persistent storage device, and thus obtaining a corresponding encrypted raw persistent storage device;
(f) creating said filesystem on said encrypted raw persistent storage device;
(g) deploying said encrypted data service on said filesystem for storing and accessing data as encrypted data-at-rest;
(h) providing said steps (a) through (g) to be performed by a coordinator module operating in said PaaS environment; and
(i) providing said encrypt-decrypt kernel module to trap write operations issued from said encrypted data service for ongoing encryption, and providing said encrypt-decrypt kernel module to trap read operations issued from said encrypted data service for ongoing decryption of said encrypted data-at-rest.

5. The computer-implemented method of claim 4, storing said encrypted data-at-rest in said filesystem in one of a relational database, a noSQL database, an object database and flat files.

6. The computer-implemented method of claim 4 with said encryption addon further comprising one or both of a pre-filesystem-unmounting callout and a pre-filesystem-destroying callout.

7. The computer-implemented method of claim 6, providing said pre-filesystem-destroying callout to be executed during a dismantling of said encrypted data service.

\* \* \* \* \*